Dec. 2, 1947.  H. F. WATERS  2,432,054
METHOD OF CONTINUOUSLY FORMING FLUID-TIGHT PACKAGES
Original Filed April 27, 1940  2 Sheets-Sheet 2
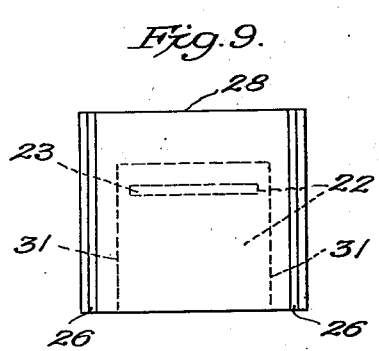
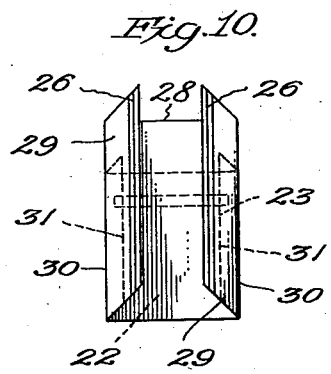
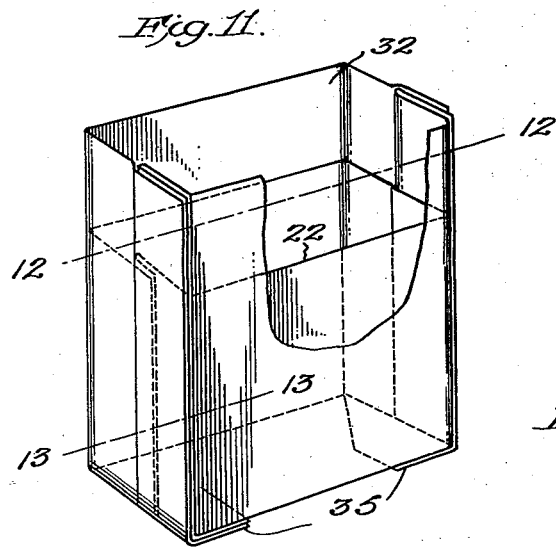
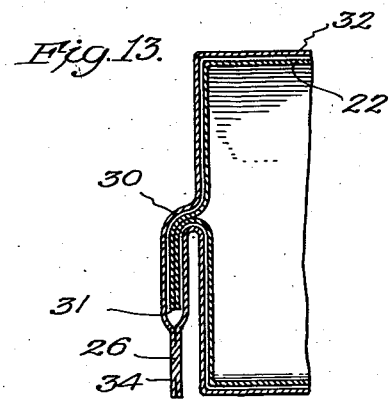
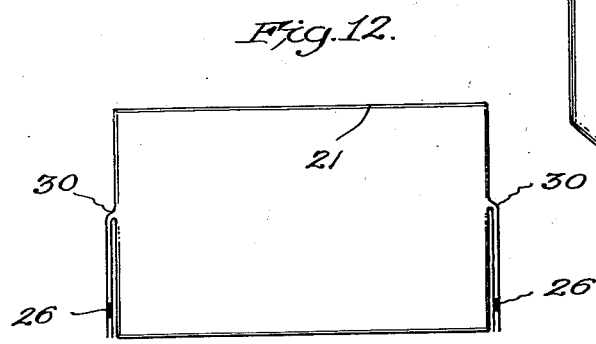
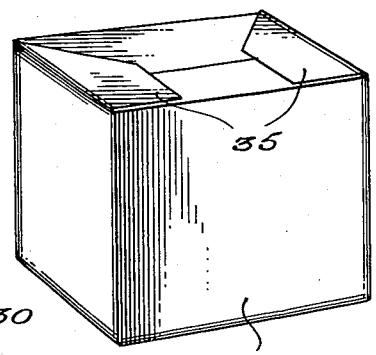
INVENTOR.
HARRY F. WATERS
BY Frederick A. Norton
ATTORNEY Patented Dec. 2, 1947

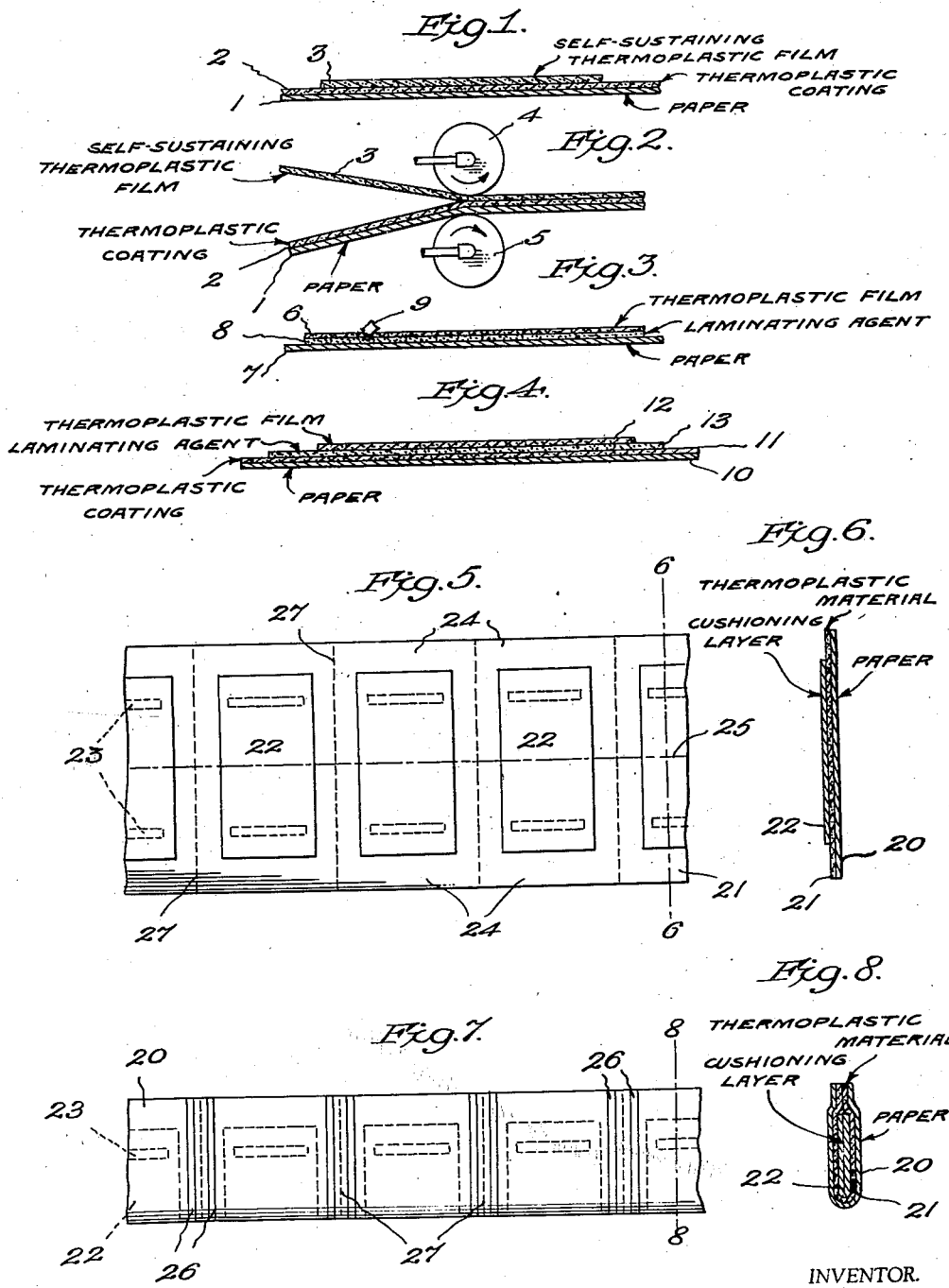

2,432,054

UNITED STATES PATENT OFFICE 2,432,054

METHOD OF CONTINUOUSLY FORMING FLUID-TIGHT PACKAGES

Harry F. Waters, New York, N. Y.

Original application April 27, 1940, Serial No. 331,907. Divided and this application December 18, 1941, Serial No. 423,426

2 Claims. (Cl. 93—36.01)

The present invention relates to a novel method for continuously producing fluid-tight packages, and, more particularly to providing such packages with internal, flexible, cushioning members.

This application is a division of my application Serial No. 331,907, filed April 27, 1940, for Puncture-proof composite sheets and method of making the same.

Heretofore, various composite sheets were proposed for the purpose of fluid-tight packages. Generally speaking, these prior sheets included a base of non-fusible character and a thermoplastic and fusible coating or layer on said base which determined the fluid-tight character of the finished product and made it possible to unite and to seal a sheet of this type with sheets of similar type by the application of heat and pressure. While these prior sheets were satisfactory in operation for fluid-tightly packaging liquids and certain other commodities which had to be sealed and preserved against the effect of atmospheric influences, difficulties were experienced particularly in packaging granular materials such as, for example, coffee. As those skilled in the art know, it is desirable to pack fresh roasted and ground coffee in a vacuous atmosphere or in an atmosphere devoid of air and substantially constituted of carbon-dioxide. When coffee was packed in a flexible-walled, fluid-tight container and the air was removed from such container, the external pressure had the effect of strongly pressing the container walls against the sharp granules of the contents. Especially when the packed coffee was of the steel-cut variety, extremely sharp edges were present on the individual granules and these edges tended to cut through the paper when this was pressed against the granules by the external atmospheric pressure. As a result, frequently leakage points or areas developed and made the value of this type of vacuum-packing problematical. Although it was already suggested to provide liner materials of accentuated thickness and strength which were capable of resisting cutting effects of sharp granules, such liner materials were relatively expensive and increased the cost of the packaging method. Likewise, as far as I am aware, none of the various other suggestions and proposals made in the past was completely satisfactory and successful on a practical and commercial scale.

It is a feature of novelty of the present invention to provide a continuous method for the production of puncture-proof, fluid-tight packages, characterized by having a cushioning layer generally not fusible or fluid-tight in character constructed and arranged to reinforce the liner in the region where it is exposed to the mechanical effects of the contents, but leaving the regions where a heat-seal of fusible material is to be provided intact.

Other and further objects and advantages of the invention will become apparent from the following description taken in conjunction with the accompanying drawing, in which:

Fig. 1 illustrates a longitudinal sectional view of a portion of a puncture-proof, fluid-tight sheet embodying the principles of the present invention;

Fig. 2 depicts a diagrammatic view, somewhat fragmentary in character, of an apparatus for producing the puncture-proof, fluid-tight sheet shown in Fig. 1;

Fig. 3 shows a sectional view of a modified embodiment of the invention into a liner material having a plasticized intermediate layer of a laminating agent;

Fig. 4 is a similar view of a further modified embodiment of the invention into a puncture-proof composite sheet having four layers;

Fig. 5 illustrates a plan view of a composite sheet in the form of a strip or web for forming fluid-tight packages and having a flexible cushioning layer or member attached to pre-determined regions thereof;

Fig. 6 is a section taken on line 6—6 of Fig. 5;

Fig. 7 depicts the strip or web shown in Fig. 5 after it has been folded about its longitudinal medial line;

Fig. 8 is a section taken on line 8—8 of Fig. 7;

Fig. 9 illustrates a plan view of a portion of the strip shown in Fig. 7 after it has been separated into unit lengths and has been heat-sealed at two edges thereof to form an envelope;

Fig. 10 shows a perspective view of an envelope formed from the structure of Fig. 9 with its lateral marginal portions bent up;

Fig. 11 is a perspective view of the envelope shown in Figs. 9 and 10 in its squared-up position and having its bottom formed and sealed;

Fig. 12 is a section taken on line 12—12 of Fig. 11;

Fig. 13 is a section taken on line 13—13 of Fig. 11, the thickness of the materials being greatly exaggerated for reasons of clarity; and Fig. 14 is a perspective view of a finished fluid-tight package formed from the envelope shown in Figs. 9 to 11.

Broadly stated, according to the principles of my invention, I provide a combination of a plurality of layers of fusible and non-fusible flexible materials and thereby I obtain a strong and fluid-tight structure fusible on at least one face thereof. My invention might take various forms. Thus, I may combine a flexible base coated with a thermo-plastic material with a self-sustaining thermo-plastic layer, or film, by the application of heat and pressure. The advantage of this type of composite material resides in the circumstance that two layers of thermo-plastic materials are placed face to face against each other and are firmly bonded by fusion. Due to the fact that in the moment of heat fusion or bonding, the opposing surfaces are in an at least partially plastic condition, pin holes or similar discontinuities present in either thermo-plastic layer will be filled out by the plastic material of the other layer. Similar results are obtained by bonding a thermo-plastic-coated flexible base with a self-sustaining, thermo-plastic sheet, or strip, by means of a suitable adhesive or laminating agent. I have found that great advantages are obtained by incorporating a suitable plasticizing agent into the adhesive having an affinity to the thermo-plastic materials used. This makes it possible to use a non-stretchable and tough thermo-plastic material which is easy to laminate and which by the slow migration of the plasticizer thereinto is converted into a relatively yielding layer, or film, which is very desirable for the purpose of fluid-tight packages. As a further modification of my invention, a cushioning layer of restricted area may be applied to pre-determined regions of a flexible liner fusible on at least one face thereof. This cushioning layer does not have to be of a thermo-plastic or fluid-tight character and may be constituted of a very dense and tough paper of non-fusible surface adapted to protect the fusible layer from the mechanical effects of sharp granules of the contents of a package, as it will be explained more fully hereafter.

Referring now more particularly to Figs. 1 and 2 of the drawing, a preferred embodiment of the invention will be explained. This type of puncture-proof composite sheet comprises a base 1 constituted of a non-fusible flexible material, such as paper, having a coating 2 of a suitable thermo-plastic material provided thereon. A top layer of a self-sustaining thermo-plastic layer or film 3 is bonded to the coating 2. I have found that best results are obtained by employing heat and pressure to bond the coated paper to the self-sustaining thermo-plastic film. This bonding operation by means of heat and pressure is preferably carried out by means of a pair of rolls 4 and 5 (Fig. 2). As it will be observed in Fig. 2, paper base 1 is pre-formed and is provided with a relatively thin coating 2 of thermo-plastic material by any one of the well known conventional coating processes. A pre-formed thermo-plastic strip or film 3 is passed in pressure contact with this coated base between rolls 4 and 5 heated to a suitable temperature which will cause fusion of the thermo-plastic layers on at least the opposing surface thereof, whereby such layers will be firmly and uniformly bonded to each other throughout the entire surface thereof. Preferably, the upper roll 4, which is in direct contact with the self-sustaining thermo-plastic material or film 3, is heated only to a moderately high temperature or is even maintained at room temperature to avoid fusion of the thermo-plastic film on the surface of this roll. On the other hand, lower roll 5 is heated to a temperature which is above the melting or softening point of the thermo-plastic material so that sufficient heat is transferred through the paper base to at least superficially fuse the self-sustaining thermo-plastic film and coating and thereby to firmly bond them together throughout the entire surface thereof. I have found that this bonding of a coated paper with a thermoplastic, self-sustaining film may be carried out with great facility and at a high speed. The resulting composite sheet is extremely strong and is completely free from pin holes, cracks, discontinuities and similar danger points of leakage. The probable reason for this surprising phenomenon is that during the bonding operation the two layers of thermo-plastic material are softened and pin holes and other openings present in either of the layers will be filled out and sealed by the other layer. The result is that the finished product is completely free from pin holes and has a uniformly tough and strong surface formation greatly resistant to puncturing. Experiments have demonstrated that a composite sheet laminated by heat and pressure in accordance with the principles of my invention may be considerably stronger than a single layer of thermo-plastic material the thickness of which greatly exceeds the combined thicknesses of the self-sustaining thermo-plastic film and of the thermoplastic coating. Moreover, the resultant structure is very inexpensive in character due to the fact that the coating on the base may be of greatly restricted thickness.

Great variations are possible in the material and in the character of the thermo-plastic substances employed for the coating and for the self-sustaining film respectively. In the simplest case both layers may be constituted of the same thermo-plastic material. In some cases, however, it is advantageous to employ thermo-plastic materials of different melting point in order to fuse the stronger thermo-plastic layer and thereby to fill out discontinuities of the weaker layer. Of course, all of these modifications will be obvious to those skilled in the art including various other modifications not specifically referred to in this specification.

Fig. 3 illustrates a modified embodiment of the invention in which a tough and non-yielding thermo-plastic layer, or film 6, such as, for example, a layer of a chlorinated rubber known under the trade-name of Pliofilm, is bonded to a base of paper 7 by means of a layer of a laminating agent or adhesive 8. I have found that for the purpose of fluid-tight packages it is desirable to employ a flexible sheet which is fluid-tight and fusible on at least one face thereof and which is capable of being stretched at least to a limited extent. In the past considerable difficulty was experienced in manufacturing sheets of this type. Most thermo-plastic films available are of a generally tough and non-yielding nature and if they were plasticized by the incorporation of a suitable plasticizing agent, it was difficult to laminate them with a base of non-yielding character. I have found that this difficulty can be eliminated by the provision of a normally tough and non-yielding thermo-plastic film which is easy to laminate and which is gradually plasticized and made stretchable by the incorporation of a migratory plasticizer into the adhesive or laminating agent. Thus, while the thermo-plastic film is laminated it is still in the tough and non-yielding condition so that it can be readily bonded to the base. After the bonding operation is finished, the plasticizer contained in the adhesive or laminating agent will gradually migrate to the thermo-plastic top layer and will gradually convert the same into a yielding thermo-plastic film. Experiments have demonstrated that a thermo-plastic film having the described gradually plasticized character is capable of resisting puncturing with great facility in that due to its slightly yielding character it will stretch sufficiently around the edges of a sharp granule indicated at 9 in Fig. 3 without being punctured. As a further modification of this concept, in Fig. 4 I show another composite and puncture-proof sheet which is constituted of four layers. Of these layers the lowest one 10 is preferably constituted of strong paper, such as kraft paper. Base 10 is provided with a thin coating 11 of a thermo-plastic material. To this coating layer is bonded a normally tough thermo-plastic film or layer 12 by means of an appropriate laminating agent interposed in the form of a thin film or layer between thermo-plastic layers 11 and 12. Laminating layer 13 is of a character similar to that of layer 8 in Fig. 3 in that it contains a migratory plasticizer adapted to gradually convert the normally tough top layer into a thermo-plastic layer capable of stretching or yielding to a limited extent. The advantages of this modified embodiment are similar to that of the sheet shown in Fig. 3 and consist in its ability to resist puncturing influences due to its stretching and yielding character. In fact, in this case this resistance is even stronger as a result of the provision of two fluid-tight layers 12 and 11 of which one is sufficient to insure the fluid-tightness of the finished package. Even in case one of these fluid-tight layers would be punctured, the remaining layer will be sufficient to positively prevent leakage particularly in view of the presence of the laminating layer therebetween which has the double effect of providing a cushioning effect and also has at least some resistance to the permeation of fluids. Therefore, this type of sheet provides very great protection under the most difficult operating conditions.

Figs. 5 to 12 illustrate an embodiment of my invention in which the fluid-tight and puncture-proof character of a package is obtained by the provision of a cushioning layer provided on top of the composite sheet. This cushioning layer or member does not have to be of a fluid-tight or fusible character, its only object being to provide mechanical reinforcement of the sheet and of the finished package against puncturing influences. The structure and the operation of this modified sheet will be best understood in connection with the description of the procedure of forming a fluid-tight package therefrom.

The general structure and arrangement of this sheet will be readily understood from Figs. 5 and 6, showing a composite sheet in the form of a strip or web for the continuous production of fluid-tight packages. This sheet or strip comprises a base 20 constituted of paper or of some similar flexible and sheet-like material. This base is provided with a thermo-plastic and fusible covering layer 21, generally covering the complete surface of the base. This suitable covering layer may be provided by means of a coating method or by means of a calendering method of the type disclosed in my co-pending application, Serial No. 329,254 filed on April 12, 1940, now Patent No. 2,228,647 of January 14, 1941. On top of covering layer 21 I provide individual rectangular elements 22 of a suitable cushioning material secured to the fusible covering layer 21 by lines 23 of a suitable adhesive preferably of the type which remains flexible after drying, such as latex. Cushioning members 22 have only the object of reinforcing the inner surface of this composite sheet or liner against mechanical influences and they do not have to contribute to the fluid-tightness of the finished package which is provided by liner 21. Likewise, it is not necessary to have cushioning layers 22 of a thermo-plastic or fusible character but it is sufficient to provide such restricted dimensions thereof that they will leave at least the major portion of the heat-sealing regions of the finished sheet or strip uncovered so that such uncovered fusible regions may be united by the application of heat and pressure. In the instant case the dimensions of cushioning members 22 are such as to permit heat-sealing of the strip in the regions around the same denoted by reference character 24 which subsequently will form the seams of the finished package, as it will appear hereinafter. Although various flexible materials may be used for the cushioning members 22, I prefer to employ a thin but very strong and tough paper having a very dense and puncture-resisting structure such as glassine paper.

In forming a package from the finished strip, the first step is to fold the strip along its longitudinal center line 25. This, same as all of the other subsequent operations, may be accomplished manually but in actual practice generally automatic machinery will be employed such as a forming plate in connection with conventional auxiliary devices. Figs. 7 and 8 show the strip after it has been folded along center line 25. The strip may be heat-sealed along spaced transverse lines forming transverse seams 26 which divide the space between the folded-over portions of the strip into container spaces. Hereafter, the strip may be cut along lines 27 whereby individual fluid-tight envelopes are obtained. The appearance of one of these envelopes is shown in Fig. 9. It will be readily observed in this figure that the finished envelope is completely flat, is sealed by seams 26 at two edges thereof and has its top edge 28 open for the introduction of materials to be packed therein. Attention is directed to the circumstance that cushioning member 22 will form an inner layer or envelope within the outer envelope and due to the presence of glue lines 23 this cushioning member or envelope will open and close together with the outer envelope. Of course, instead of the provision of these glue lines bonding only certain portions of the cushioning member to the envelope, the complete surface of the cushioning member may be bonded to the envelope by means of a similar adhesive. It will be noted that the side edges and the top edges of cushioning member 22 do not extend into the seams 26 so that in this region only the corresponding portions of thermo-plastic layer 21 are placed into a face to face contact. Of course, there is no objection to having the side edges of the cushioning member extending into a portion of the heat-seam in order to have them firmly bonded with and locked in the seam. After the envelope with the innermost cushioning and protective layer has been completed, its lateral marginal portions 29 may be folded back, this having the object of placing seams 26 beyond fold lines 30 and thereby to provide additional protection for the seam. In addition, it will be observed that due to the dimensions of cushioning member 22, its side edges 31 will likewise be beyond fold lines 30 so that these edges are also protected and are placed into a region which is not accessible to contact with the contents packed within the inner space of the finished envelope, or container. The envelope may now be squared-up (Fig. 11) and its bottom portion may be folded in. This squaring-up operation may be accomplished by means of a suitable device such as a mandrel, may be accomplished manually or may be carried out by previously attaching the finished envelope to an outer carton formed separately or simultaneously with the formation of the envelope as this is disclosed, for example, in my co-pending application, Serial No. 329,254, filed on April 12, 1940, now Patent No. 2,228,647. It will be readily seen in Fig. 11 that cushioning member 22 will provide a complete inner bag or container within the finished squared-up envelope so that after the finished container is filled with contents, such as coffee, the granules of the contents will be at no place in direct contact with the thermo-plastic layer or film 21. Thus, a very strong protection will be obtained against puncturing influences and generally speaking, the danger of puncturing by sharp grains of the packed material will be eliminated.

The exact structure of the interlocking portions of the outer envelope and of the inner cushioning layer or bag will be best understood from Fig. 13 which is a section taken on line 13—13 of Fig. 11, the dimensions of the thermo-plastic-coated or covered paper sheet 32 and of the cushioning layer or sheet being greatly exaggerated for reasons of clarity. Likewise, to increase the clarity of illustration, the paper base and the thermo-plastic layer on the inner face thereof have been illustrated as a single layer 32, rather than two layers 20 and 21, as in Figs. 5 to 8. Fig. 13 clearly shows that the lateral ends of outer envelope 32 are fluid-tightly sealed by means of a seam 26 and that fin 34 thus formed is turned down flat along the end walls of the squared-up envelope, or container. The side edges 31 of cushioning member or bag 22 are placed face to face against each other and are carried beyond medial fold line 30 and extend into the base portion of fin 34. They are retained in this position by friction which in itself assures sufficient stability of the structure. As a modification, it is also possible to further extend the side edges 31 of the cushioning member to partially protrude into seam 26 whereby a more rigid interlocking of envelope and cushioning member is obtained. This interlocking effect may be further accentuated by coating or printing at least the lateral terminal regions of cushioning member 22 with a thin layer of a thermo-plastic material which is fused during the provision of seam 26 and provides a strong and permanent bond between envelope and cushioning member.

After filling the internally lined or cushioned container, the air is preferably withdrawn therefrom and the mouth portions of the container are hermetically sealed by means of a completely flat top seal provided by the application of heat and pressure. The upper marginal portions of the container may be folded down in the form of tabs 35 similar to the corresponding tabs of the bottom portions of the container. Preferably, the dimensions of cushioning member 22 are so determined as to have it extend sufficiently upwards toward the mouth opening of the container to prevent direct contact between the granules of the packed material and the inner walls 32 of the package. In fact, in some cases it is advantageous to extend the upper edges of the cushioning member or bag until the region where the top transverse seam is provided whereby the packed material will be completely and positively surrounded by the cushioning member.

The external appearance of the finished package 33 is illustrated in Fig. 14. While this package has been shown as of a completely rectangular structure, it will be obvious to those skilled in the art that after removal of the internal atmosphere from the package, the walls thereof will collapse around the contents and as a result, the shape of the package will be distorted to a smaller or greater extent.

Of course, it will be readily appreciated that a wide variety of thermo-plastic materials may be employed for forming the self-sustaining films and coatings incorporated into the composite sheets of the invention. Preferred thermo-plastic materials are, for example, certain types of rubber compounds, particularly rubber hydrochloride products sold under the name of Koroseal and Pliofilm, certain vinyl resins such as particularly a vinyl derivative sold under the name Vinylite V, which is a co-polymerized vinyl chloride and vinyl acetate. Of course, various other thermo-plastic and re-fusible materials may be used and at present a large number of such materials is available on the market, as those skilled in the art know. It is essential that the thermo-plastic and re-fusible material should be capable of providing flexible, tough, non-tacky, moisture-proof and gas-proof films of a self-sustaining character.

Likewise, the laminating agent employed in connection with the embodiments of the invention shown in Figs. 3 and 4 of my parent application, above-identified may be of various character in accordance with the thermo-plastic material to be laminated. Generally, the laminating agent should contain a thermo-plastic material similar to the one of which the thermo-plastic layer to be laminated is constituted, a suitable solvent therefor, and a plasticizing agent, for example a plasticizing agent sold under the name of "Santicizer 15," "16" or "17," and comprising respectively ethyl phthalyl ethyl glycollate; butyl phthalyl butyl glycollate; and methyl phthalyl ethyl glycollate. As a practical example, a laminating agent constituted of about 60 parts by weight of acetone, about 20% by weight of a suitable vinyl resin, and about 20% by weight of "Santicizer 17" provides good results for laminating a self-sustaining thermo-plastic sheet constituted of a similar vinyl resin. This laminating agent is a viscous liquid which may be readily spread on or applied to the surfaces to be laminated.

It is essential that the self-sustaining thermo-plastic material forming the top layer of the composite sheet should originally contain a smaller amount of the same plasticizer than the laminating agent so that after the lamination, the plasticizer present in the laminating agent in a higher relative amount should migrate into the top layer where such plasticizer is present in a lower relative amount. I have found that when it was attempted to directly incorporate such accentuated amounts of plasticizer into the top film, such film became tacky and difficult to use and to laminate, while when such high percentage of plasticizer was gradually obtained by the slow migration of the plasticizer from the laminating agent into the top layer, such tackiness was avoided and a desirable yielding and stretchable, very slowly aging film was obtained. The probable reason for this curious phenomenon is that the migratory plasticizer, while permeating most of the thickness of the top layer, will not be present in the uppermost surface or "skin" portion thereof which thus will act as a non-tacky protective layer. Of course, my invention is independent from the correct or incorrect nature of this theoretical consideration.

In some cases when the top layer to be laminated is constituted of a polyvinyl alcohol or of regenerated cellulose, it is possible to use an aqueous solution of glycerine and gelatine as a laminating agent, the glycerine being the migratory plasticizer proper while the gelatine acts as a type of inhibitor to prevent unduly rapid migration of the plasticizer.

The paper employed as a base may be any suitable paper according to the type of application contemplated, for example kraft paper. The flexible cushioning member or layer may be a strong and dense paper of reduced thickness, such as glassine paper. As a rule the cushioning member or layer is not relied upon for maintaining the fluid-tight character of the package and, consequently, does not have to be of a fluid-tight character. There is no objection, however, to employ a fluid-tight material for the cushioning member or to provide a cushioning member which is fusible on at least one face thereof.

It will be noted that the present invention provides various important advantages. First of all, the invention provides various simple methods for the production of composite sheets fusible at least in certain regions of one face thereof and having a greatly reinforced and punctureproof structure.

I claim:

1. The method of continuously producing fluid-tight package blanks having inner surfaces characterized by great resistance to puncturing, which comprises forming a flexible web fluid-tight and fusible on one face thereof; securing a plurality of spaced flexible cushioning members transversely over the web; folding the advancing web along its central longitudinal fold line; heat-sealing only the folded web transversely between the severed cushioning members and then separating the so formed flat-folded bag sections from the continuous web.

2. The method of forming flat-folded bag liners adapted upon erection to be inserted into paperboard containers, comprising applying spaced cushioning members transversely over an advancing fusible thermoplastic sheet, the said cushioning members being spaced inwardly of the side of the said sheet and adhered thereto adjacent to said sides; folding the web over along its central longitudinal axis with the cushioning members folded flat upon themselves; heat-sealing the composite web transversely between the several unsealed cushioned segments to form a continuous web of flat-folded bag sections separated by unsealed transverse sections, and severing the bag sections from the web along the said transverse unsealed sections.

HARRY F. WATERS.

REFERENCES CITED

The following references are of record in the file of this patent:

UNITED STATES PATENTS

| Number | Name | Date |
|---|---|---|
| 2,162,263 | Lindholm | June 13, 1939 |
| 2,176,370 | Wagner | Oct. 17, 1939 |
| 2,185,647 | Penn et al. | Jan. 2, 1940 |
| 2,257,823 | Stokes | Oct. 7, 1941 |